United States Patent
Mizoguchi

(10) Patent No.: US 11,628,864 B2
(45) Date of Patent: Apr. 18, 2023

(54) VEHICLE DRIVING ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 353 days.

(21) Appl. No.: 16/890,804

(22) Filed: Jun. 2, 2020

(65) Prior Publication Data
US 2021/0053589 A1 Feb. 25, 2021

(30) Foreign Application Priority Data

Aug. 21, 2019 (JP) .............................. JP2019-151457

(51) Int. Cl.
B60W 60/00 (2020.01)
G01C 21/32 (2006.01)
G01C 21/36 (2006.01)

(52) U.S. Cl.
CPC .... *B60W 60/0025* (2020.02); *B60W 60/0053* (2020.02); *G01C 21/32* (2013.01); *G01C 21/3679* (2013.01); *B60W 2540/10* (2013.01); *B60W 2540/20* (2013.01); *B60W 2552/53* (2020.02)

(58) Field of Classification Search
CPC ......... B60W 60/0025; B60W 60/0053; B60W 2540/10; B60W 2540/20; B60W 2552/53; B60W 30/18154; B60W 10/04; B60W 10/18; B60W 2520/10; B60W 2540/12; B60W 2540/18; B60W 2552/50; B60W 2556/40; G01C 21/32; G01C 21/3679
See application file for complete search history.

(56) References Cited

U.S. PATENT DOCUMENTS 8,670,915 B2 * 3/2014 Kuge .................... B60W 50/16
                                                     701/301
9,098,080 B2 * 8/2015 Norris .................. G05D 1/0061
(Continued)

FOREIGN PATENT DOCUMENTS

JP     2010221858 A  * 10/2010
JP     2014-227877 A    12/2014

OTHER PUBLICATIONS

English Translation of JP-2010221858-A.*

*Primary Examiner* — Rami Khatib
*Assistant Examiner* — Shahira Baajour
(74) *Attorney, Agent, or Firm* — McDermott Will & Emery LLP

(57) ABSTRACT

A vehicle driving assist apparatus includes a first unit to set a degree of acceleration suppression to suppress acceleration of a vehicle, a controller to suppress target acceleration of the own vehicle based on the degree of acceleration suppression, a storage to store road map information, an estimator to estimate a vehicle position, a detector to map-match the estimated vehicle position to the road map information and detect whether there is a crossing road ahead of the vehicle, a second setting unit to set, when the detector detects the crossing road, a traveling-prohibited region on an opposite side of the vehicle on the road map information, and a calculator to calculate a reaching distance from the vehicle to the region. The degree of acceleration suppression is set to a higher value as the reaching distance becomes shorter.

10 Claims, 7 Drawing Sheets

(56) References Cited

U.S. PATENT DOCUMENTS

| | | | |
|---|---|---|---|
| 2013/0338914 A1* | 12/2013 | Weiss | G08G 1/0129 340/905 |
| 2015/0266473 A1* | 9/2015 | Hayasaka | B60W 30/09 701/70 |
| 2015/0321555 A1* | 11/2015 | Fukata | G06V 20/586 701/70 |
| 2016/0137197 A1* | 5/2016 | Hayakawa | B60W 30/18154 701/70 |

* cited by examiner

VEHICLE DRIVING ASSIST APPARATUS

CROSS-REFERENCE TO RELATED APPLICATIONS

The present application claims priority from Japanese Patent Application No. 2019-151457 filed on Aug. 21, 2019, the entire contents of which are hereby incorporated by reference.

BACKGROUND

The technology relates to a vehicle driving assist apparatus configured to suppress acceleration of an own vehicle according to a road situation even in a case where no obstacle is detected ahead in a traveling direction of the own vehicle.

When driving an own vehicle, a driver cannot watch the accelerator pedal and the brake pedal when trying to slow down and stop the vehicle from a traveling state or keep the vehicle stopped, and the driver may step on the accelerator pedal mistaking it for the brake pedal and continue stepping on the accelerator pedal without noticing the misstep.

As countermeasures for such a misstep, a misstep preventing apparatus that can be added separately to the accelerator pedal, a one-pedal misstep preventing apparatus that can be attached in place of the existing accelerator pedal and brake pedal in which the accelerator pedal and the brake pedal are integrated as one body are already commercially available. However, retrofitting of such a misstep preventing apparatus will impose an economic burden on a user. On the other hand, the one-pedal system requires a certain period of time for the user to get used to operation.

Thus, for example, Japanese Unexamined Patent Application Publication No. 2014-227877 discloses a technique for detecting a misstep using a vehicle speed sensor, an obstacle detection sensor for detecting an obstacle ahead and existing sensors for detecting a driving state and traveling environment of the own vehicle such as an accelerator position sensor (accelerator opening sensor).

That is, the technique disclosed in the aforementioned publication examines the presence of an obstacle hindering traveling of the own vehicle using an obstacle detection sensor, examines, when an obstacle is detected, whether a depression amount and a depression speed of the accelerator pedal detected using an accelerator position sensor exceed predetermined thresholds and restricts, when the depression amount and the depression speed exceed the thresholds, the throttle opening to prevent abrupt acceleration.

SUMMARY

An aspect of the technology provides a vehicle driving assist apparatus. The apparatus includes an acceleration suppression degree setting unit, a traveling state controller, a map information storage, an own vehicle position estimator, an own vehicle position estimator, a traveling-prohibited region setting unit, and a reaching distance calculator. The acceleration suppression degree setting unit is configured to set a degree of acceleration suppression to suppress acceleration of an own vehicle. The traveling state controller is configured to suppress target acceleration of the own vehicle based on the degree of acceleration suppression set by the acceleration suppression degree setting unit. The map information storage is configured to store road map information. The own vehicle position estimator is configured to estimate an own vehicle position that is a current position of the own vehicle. The crossing road detector is configured to map-match the own vehicle position estimated by the own vehicle position estimator to the road map information stored in the map information storage and detect whether there is a crossing road ahead of the own vehicle. The traveling-prohibited region setting unit is configured to set, when the crossing road detector detects the crossing road, a traveling-prohibited region on an opposite side of the own vehicle on the road map information across a lane of the crossing road. The reaching distance calculator is configured to calculate a reaching distance from the own vehicle to the traveling-prohibited region. The acceleration suppression degree setting unit sets the degree of acceleration suppression to a higher value as the reaching distance becomes shorter, based on the reaching distance calculated by the reaching distance calculator.

An aspect of the technology provides a vehicle driving assist apparatus. The includes a map information storage and circuitry. The map information storage is configured to store road map information. The circuitry is configured to set a degree of acceleration suppression to suppress acceleration of an own vehicle. The circuitry is configured to suppress target acceleration of the own vehicle based on the set degree of acceleration suppression. The circuitry is configured to estimate an own vehicle position that is a current position of the own vehicle. The circuitry is configured to map-match the estimated own vehicle position to the road map information stored in the map information storage and detect whether there is a crossing road ahead of the own vehicle. The circuitry is configured to set, when the crossing road is detected, a traveling-prohibited region on an opposite side of the own vehicle on the road map information across a lane of the crossing road. The circuitry is configured to calculate a reaching distance from the own vehicle to the traveling-prohibited region. The circuitry is configured to set the degree of acceleration suppression to a higher value as the reaching distance becomes shorter, based on the reaching distance.

DETAILED DESCRIPTION

When the obstacle detection sensor has not detected any obstacle hindering traveling, the technique disclosed in JP-A No. 2014-227877 determines that it is not necessary to prevent abrupt acceleration and does not perform further processing.

However, there is inconvenience that the function of preventing abrupt acceleration cannot be fully demonstrated due to a misstep in a place where obstacle detection is originally required such as a place in an environment where the obstacle detection sensor cannot sufficiently detect an obstacle due to, for example, a dense fog, rainfall, snowfall or the like or a place where there is a T-junction ahead and there is no obstacle to be detected ahead.

Note that this also applies when a driving mode in automatic driving control is shifted from an automatic driving mode to a driving assist mode such as well-known adaptive cruise control (ACC) and active lane keep (ALK) control.

Considering the above situations, it is desirable to provide a vehicle driving assist apparatus capable of recognizing in advance, a place where abrupt acceleration needs to be suppressed without using any obstacle recognition sensor and appropriately suppressing occurrence of abrupt acceleration caused by a misstep in the place.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
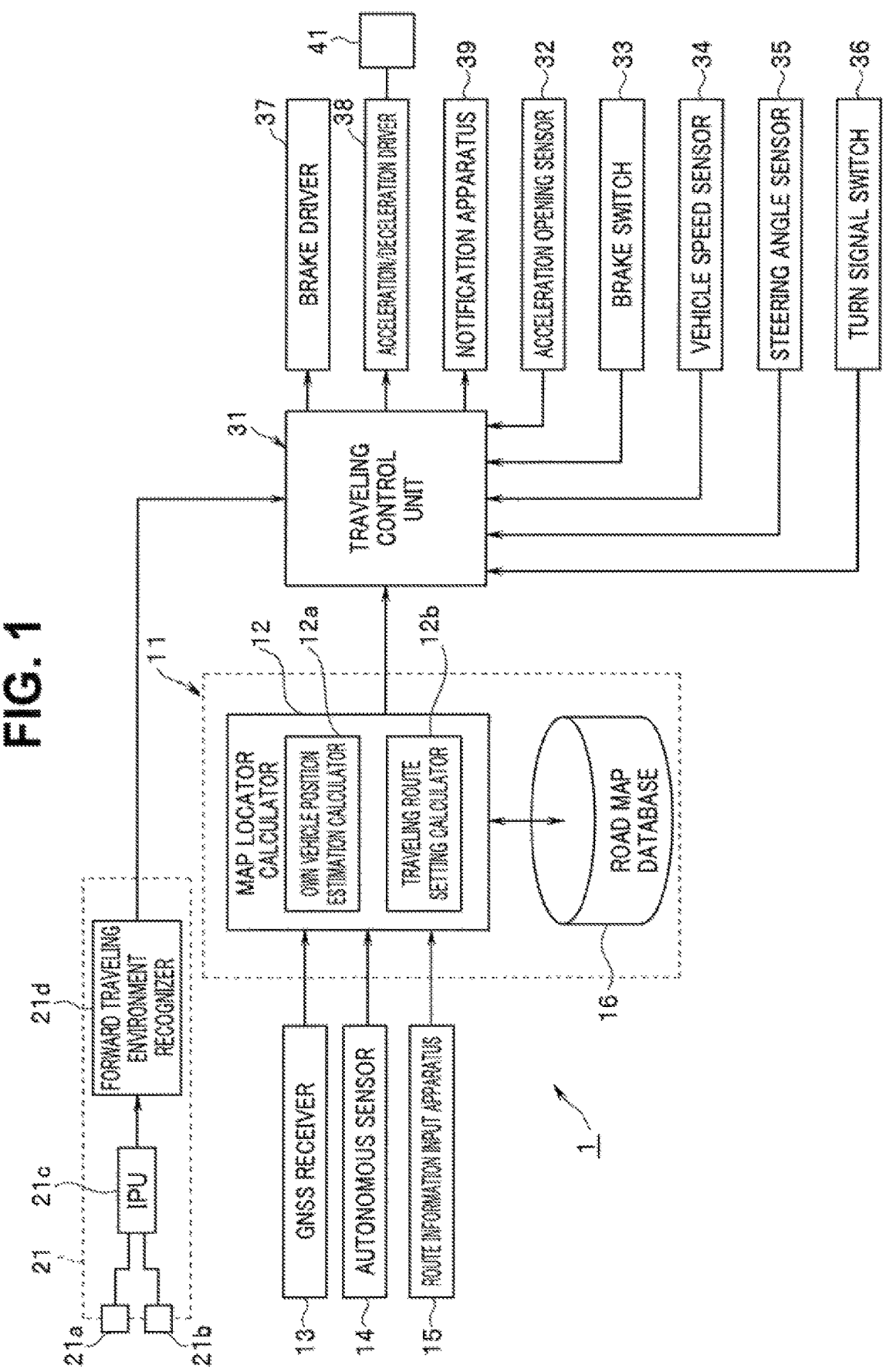
FIG. 1 is an overall schematic diagram of a driving assist apparatus.

Reference numeral 1 in FIG. 1 denotes a driving assist apparatus, which is mounted on an own vehicle M (see FIG. 7 to FIG. 10). The driving assist apparatus 1 is provided with a navigation unit 11, a camera unit 21 and a traveling control unit 31.

The navigation unit 11 includes a map locator calculator 12 and a road map database 16 as a map information storage. The map locator calculator 12, a forward traveling environment recognizer 21d, which will be described later, and the traveling control unit 31 are constructed of a well-known microcomputer provided with a CPU, a RAM, a ROM, a non-volatile storage or the like and peripheral devices, and the ROM stores fixed data such as programs to be executed by the CPU, tables and maps in advance.

A GNSS (global navigation satellite system) receiver 13, an autonomous sensor 14, and a route information input apparatus 15 are coupled to an input side of the map locator calculator 12. The GNSS receiver 13 receives positioning signals emitted from a plurality of positioning satellites. The autonomous sensor 14 estimates the position of the own vehicle in an environment such as an inside of a tunnel where reception sensitivity from the GNSS satellites is low and positioning signals cannot be received effectively, and is constructed of a vehicle speed sensor, a yaw rate sensor and a longitudinal acceleration sensor or the like. The map locator calculator 12 performs localization from a distance traveled and an azimuth based on the vehicle speed detected by the vehicle speed sensor, the yaw rate (yaw angular velocity) detected by the yaw rate sensor and the longitudinal acceleration detected by the longitudinal acceleration sensor or the like.

The route information input apparatus 15 is a terminal apparatus operated by a driver or a passenger. The route information input apparatus 15 intensively receive an input of a series of information necessary for the map locator calculator 12 to set a traveling route, such as settings of a destination, transit points (service areas of a highway or the like).

Examples of the route information input apparatus 15 a touch panel of a monitor provided for the navigation unit 11, a portable terminal represented by a smartphone, a personal computer. The route information input apparatus 15 is coupled to the map locator calculator 12 by a wired or wireless channel.

When the driver or passenger inputs information on a destination or transit points (facility names, addresses, telephone numbers or the like) by operating the route information input apparatus 15, the input information is read by the map locator calculator 12.

When the destination or transit points are inputted, the map locator calculator 12 sets the position coordinates (latitudes, longitudes) of the destination or the transit points. The map locator calculator 12 is provided with an own vehicle position estimation calculator 12a as an own vehicle position estimator that estimates the position of the own vehicle, which is a current position of the own vehicle M and identifies a traveling lane in which the own vehicle M is traveling and a traveling route setting calculator 12b that sets a traveling route from the position of the own vehicle to the destination (and transit points).

The road map database 16 is a large volume storage medium such as an HDD and stores well-known road map information. The road map information stores information representing a road condition such as a type of the road (general roads, highways or the like), road shape, road azimuth, lane width, intersection (crossroad, T-junction).

The own vehicle position estimation calculator 12a acquires current position coordinates (latitude, longitude) of the own vehicle M based on positioning signals received by the GNSS receiver 13, map-matches the position coordinates on the map information, estimates the position of the own vehicle (current position) on the road map, identifies a traveling lane and obtains an azimuth (own vehicle azimuth) in the traveling direction from a movement history of the own vehicle position.

Furthermore, in an environment such as inside a tunnel where sensitivity of the GNSS receiver 13 deteriorates and effective positioning signals cannot be received from positioning satellites, the own vehicle position estimation calculator 12a performs localization based on the information from the autonomous sensor 14 as described above.

The traveling route setting calculator 12b refers to the road map information stored in the road map database 16 based on the position information (latitude, longitude) of the position of the own vehicle estimated by the own vehicle position estimation calculator 12a and the position information (latitude, longitude) of the input destination (and transit points). The traveling route setting calculator 12b then constructs a traveling route connecting the position of the own vehicle and the destination (destination via transit points if the transit points are set) according to preset route conditions (recommended route, fastest route or the like) on the road map information.

On the other hand, the camera unit 21 is fixed at a top center at the front inside the own vehicle M and includes a vehicle-mounted camera (stereo camera) composed of a main camera 21a and a sub camera 21b disposed at symmetric positions across the center (vehicle width center) in the vehicle width direction, an image processing unit (IPU) 21c and the forward traveling environment recognizer 21d. In the camera unit 21, the main camera 21a picks up images of reference image data and the sub camera 21b picks up images of comparison image data.

Both image data are subjected to predetermined image processing by the IPU 21c. The forward traveling environment recognizer 21d reads the reference image data and the comparison image data image-processed by the IPU 21c, recognizes identical objects in both images based on a parallax between the images, calculates distance data (distance from the own vehicle M to the target) using principles of triangulation and recognizes forward traveling environment information.

The forward traveling environment information includes a road shape of a lane (traveling lane) in which the own vehicle M is traveling (lane markers that define left and right of the lane, road curvature [1/m] at the center between the left and right lane markers and width (lane width) between the left and right lane markers), intersection, traffic light, road labeling, and obstacle ahead (crossing pedestrian, bicycle, utility pole, telegraph pole, parked vehicle or the like) and the forward traveling environment recognizer 21d recognizes them using a well-known technique such as pattern matching. That is, the camera unit 21 serves as an obstacle recognition sensor.

The forward traveling environment information is read by the traveling control unit 31. The forward traveling environment recognizer 21d of the camera unit 21 and the map locator calculator 12 are coupled to an input side of the traveling control unit 31. The input side of the traveling control unit 31 is further coupled to an accelerator opening sensor 32 as an accelerator operation amount detector that detects a depression amount of the accelerator pedal (accelerator operation amount) Pacc [deg], a brake switch 33 that is turned ON when the brake pedal is stepped on, a vehicle speed sensor 34 included in the aforementioned autonomous sensor 14, a steering angle sensor 35 that detects a steering angle of a steering operated by the driver and a turn signal switch 36 that is turned ON by the driver when turning right or turning left to cause a right-turning side turn signal or a left-turning side turn signal to blink.

On the other hand, a brake driver 37 for slowing down the own vehicle M by forced brake to avoid collision with an object, an acceleration/deceleration driver 38 that restricts output of a drive source 41 such as an engine or a motor according to an accelerator operation amount Pacc by the driver as required and a notification apparatus 39 such as a monitor or a speaker that notifies the driver of information for calling attention to the driver are coupled to an output side of the traveling control unit 31. Note that, the traveling control unit 31 may cause the brake driver 37 to operate to brake the four wheels individually.

When an obstacle having the potential to collide with the vehicle is detected in the azimuth of the own vehicle M, which is traveling by steering operation of the driver, the traveling control unit 31 calls attention to the driver by the notification apparatus 39 and further assists the driver's steering operation through integrated vehicle control by the brake driver 37 for braking the four wheels individually and the acceleration/deceleration driver 38 as a collision avoidance operation.

The traveling control unit 31 further reads a road condition in a direction in which the own vehicle M travels at an intersection through the driver's steering operation from the road map information stored in the road map database 16 and performs acceleration suppression control as required to suppress abrupt acceleration by mistaking the accelerator pedal for the brake pedal. In one embodiment, the traveling control unit 31 may serve as a "traveling state controller".

Figure 2:
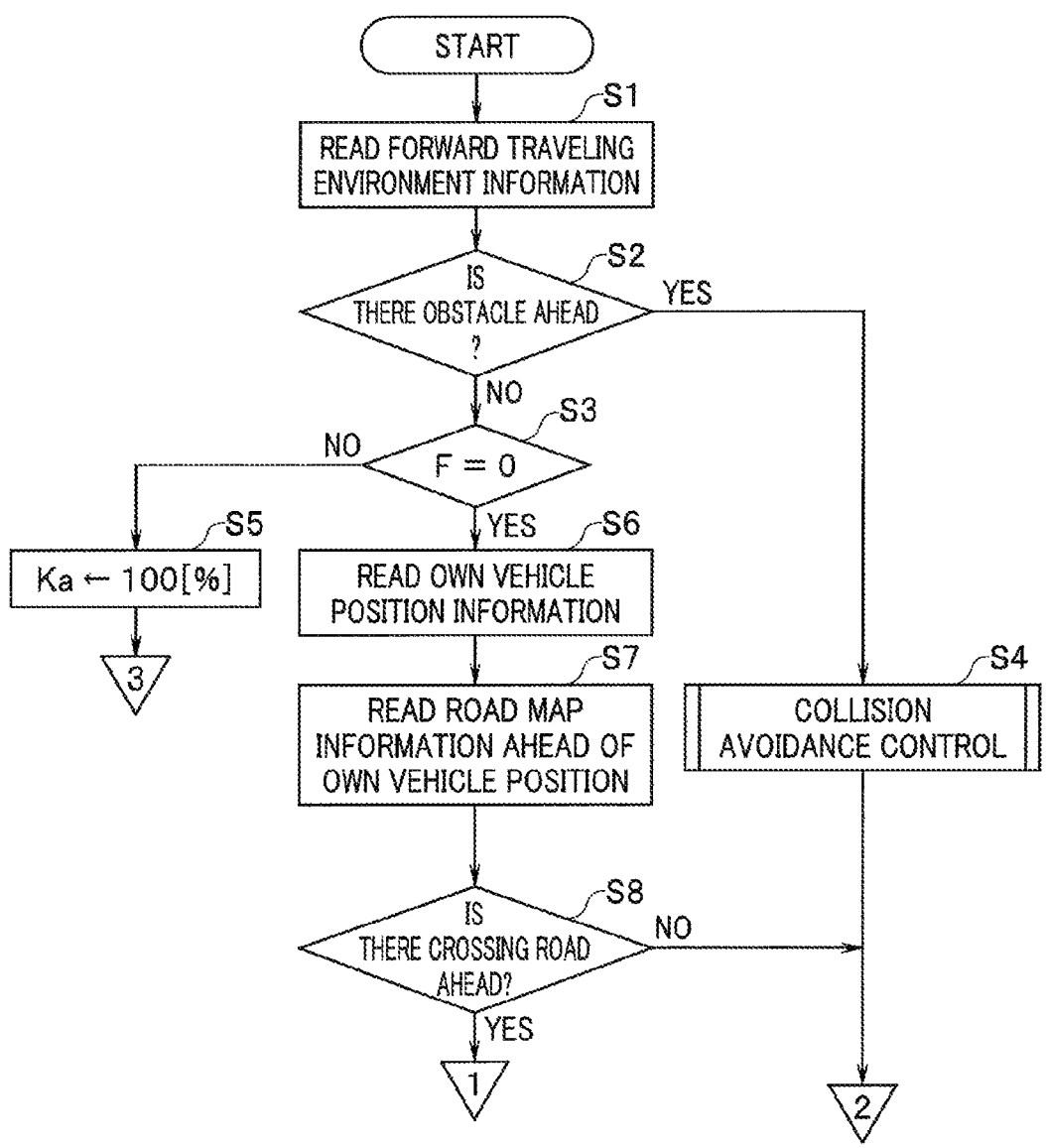
FIG. 2 is a flowchart (No. 1) illustrating an acceleration suppression control routine.
Figure 3:
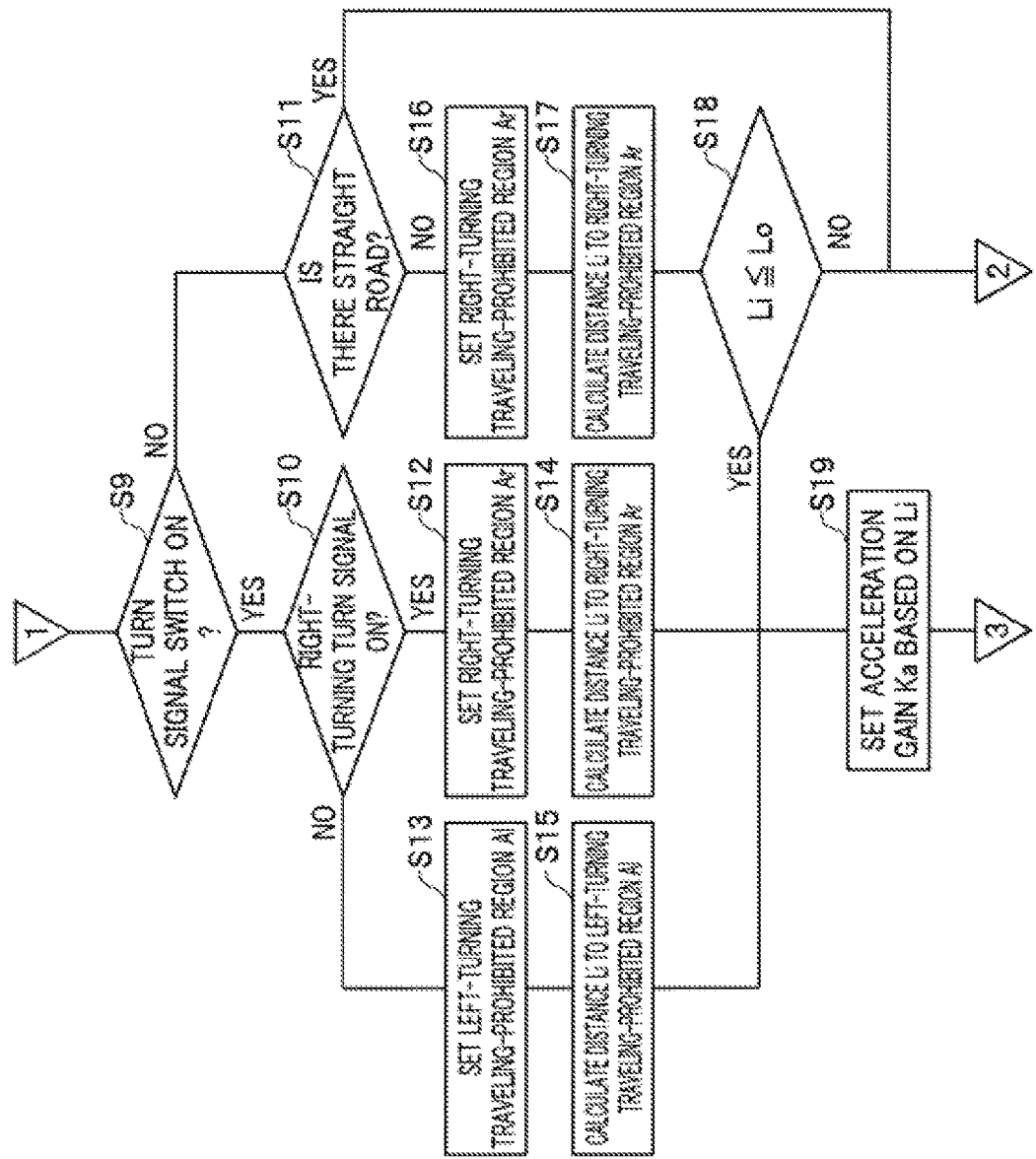
FIG. 3 is a flowchart (No. 2) illustrating the acceleration suppression control routine.
Figure 4:
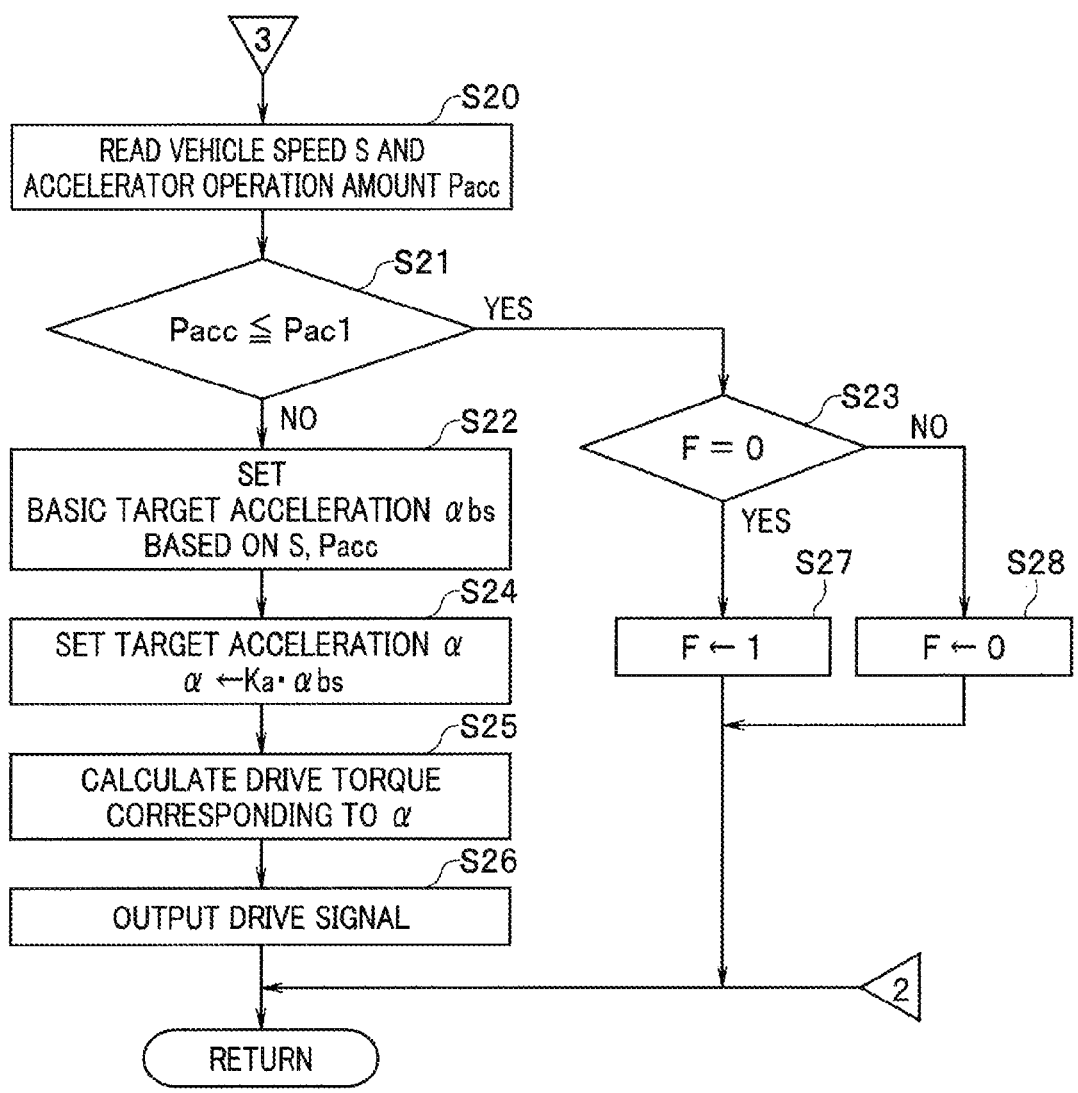
FIG. 4 is a flowchart (No. 3) illustrating the acceleration suppression control routine.

For example, the acceleration suppression control performed by the traveling control unit 31 is specifically processed according to an acceleration suppression control routine illustrated in FIG. 2 to FIG. 4. Note that roads where left-hand traffic is stipulated will be described and illustrated in embodiments below. Therefore, on roads where right-hand traffic is stipulated, the embodiment is applied supposing that the left side is read as the right side, and furthermore, right turn is read as left turn, and left turn is read as right turn.

In this routine, the forward traveling environment information recognized by the forward traveling environment recognizer 21d of the camera unit 21 is read in step S1 first, the flow proceeds to step S2 to examine whether there is an obstacle with potential collision risk ahead. When no obstacle with the potential collision risk is recognized, the flow proceeds to step S3, and when an obstacle with the potential collision risk is recognized, the flow branches to step S4. After branching to step S4, collision avoidance control is performed through well-known integrated vehicle control by the brake driver 37 and the acceleration/deceleration driver 38 to avoid collision with the obstacle and the routine exits.

On the other hand, in step S3, the value of an acceleration suppression control cancelation flag F is referred to. The acceleration suppression control cancelation flag F is set in step S27, which will be described later, and cleared in step S28. When F=1, the flow branches to step S5 where the acceleration gain Ka is set to 100 [%] and the flow jumps to step S20. The acceleration gain Ka is intended to suppress target acceleration α, which is set in correspondence with a depression amount (accelerator operation amount Pacc) of the accelerator pedal operated by the driver, and when Ka=100 [%], normal target acceleration α is set for the accelerator operation amount Pacc.

On the other hand, when F=0, the flow proceeds to step S6 to perform acceleration suppression control. In step S6, the own vehicle position information estimated by the own vehicle position estimation calculator 12a of the map locator calculator 12 is read, and in step S7, the road map information ahead of the own vehicle position is read based on the own vehicle position information with reference to the road map information of the road map database 16.

Then, the flow proceeds to step S8 to examine whether there is a crossing road based on the road map information. Here, the position "ahead of the own vehicle position" refers to a general distance where the driver is assumed to turn ON the turn signal switch 36 to turn right or turn left, and, may be, for example, within 30 to 20 meters but the position ahead of the own vehicle position is not limited to this. The "crossing road" refers to another road connected to the road on which the own vehicle M is traveling and typical examples thereof include other roads of a crossroad illustrated in FIG. 7 and a T-junction illustrated in FIG. 8. Moreover, a road connected to a parking lot is also included in the crossing road.

When it is determined in step S8 that there is a crossing road, the flow proceeds to step S9. When no crossing road is detected, the routine exits. In one embodiment, the processes in steps S7 and S8, and step S11, which will be described later, may correspond to a "crossing road detector".

When the flow proceeds to step S9, whether the turn signal switch 36 has been operated is examined and when the turn signal switch 36 has been operated (ON state), the flow proceeds to step S10 and when the turn signal switch 36 is not operated (OFF state), the flow branches to step S11. When the flow branches to step S11, whether there is a straight road continuous to the traveling lane of the own vehicle M ahead of the crossing road is examined based on the aforementioned road map information.

Figure 8:
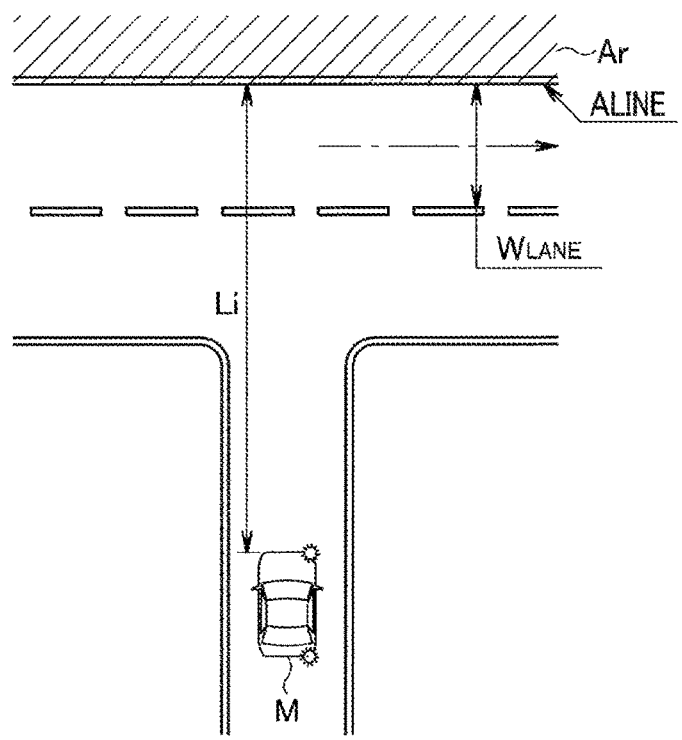
FIG. 8 is an explanatory diagram illustrating acceleration suppression control when a vehicle turns right at a T-junction.

When no straight road is continuous, for example, in the case of the T-junction illustrated in FIG. 8, the flow proceeds to step S16. That is, in this case, it is determined that the driver is trying to cause the own vehicle M to turn right or turn left without turning ON the turn signal switch.

Figure 7:
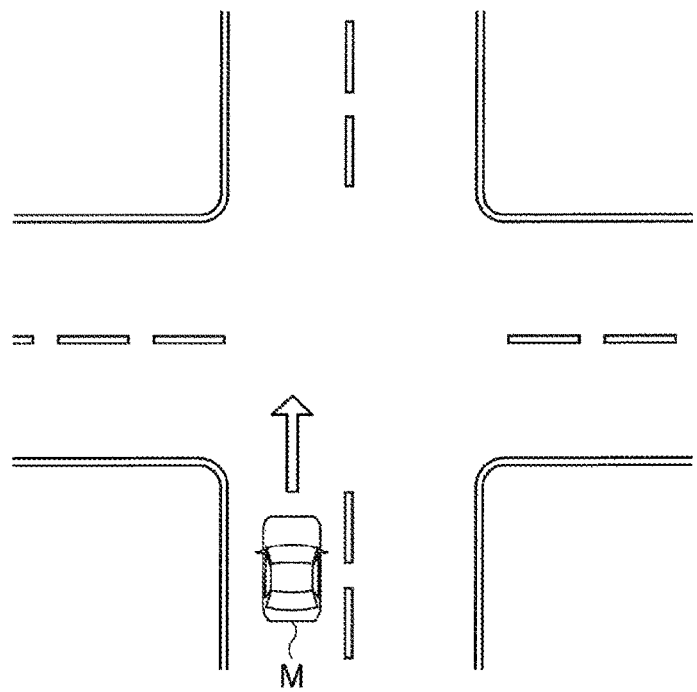
FIG. 7 is an explanatory diagram illustrating acceleration suppression control when a vehicle is traveling straight at a crossroad.

On the other hand, when it is determined that a straight road is continuous as in the case of the crossroad illustrated in FIG. 7, since the driver continues to travel straight while keeping the accelerator pedal stepped on, the driver is assumed not to mistake the accelerator pedal for the brake pedal. Furthermore, since the vehicle is traveling straight, even if the driver mistakes the accelerator pedal for the brake pedal, the vehicle may not immediately deviate from the traveling lane. Therefore, when the straight road is continuous, the routine exits.

When the flow proceeds to step S10, which of the right-turning signal or the left-turning signal is turned ON is examined to predict whether the own vehicle M is going to turn right or turn left. In one embodiment, the processes in steps S9 and S10 may correspond to a "right-turning and left-turning prediction unit".

Whether a traveling lane is continuous to a straight road across a crossing road can also be determined from the forward traveling environment information acquired by the camera unit 21. However, when there is a situation in which a sufficient field of view ahead of the own vehicle M cannot be secured due to a dense fog, rainfall, snowfall or the like, it is not possible to clearly determine whether the straight road continues.

Even when the field of view is secured, for example, in the case of the T-junction illustrated in FIG. 8 where an obstacle such as a guard rail is not disposed ahead of the crossing road, it is not possible to acquire information as to whether the straight road continues or whether there is a step such as a pier or cliff simply from the forward traveling environment information acquired by the camera unit 21.

As a result, it is no longer possible to sufficiently suppress abrupt acceleration by mistaking the accelerator pedal for the brake pedal in a place where abrupt acceleration should originally be sufficiently suppressed. Thus, in the present embodiment, whether the traveling lane of the own vehicle M continues across the crossing road as the straight road as in the case of the crossroad illustrated in FIG. 7 is examined based on the road map information.

When the right-turning signal is turned ON, the flow proceeds to step S12 by predicting that the own vehicle will turn right or when the left-turning signal is turned ON, the flow branches to step S13 by predicting that the own vehicle will turn left. When the flow proceeds to step S12, a right-turning traveling-prohibited region Ar is set and the flow proceeds to step S14. When the flow proceeds to step S13, a left-turning traveling-prohibited region Al is set and the flow proceeds to step S15. In one embodiment, the processes in steps S12 and S13, and step S16, which will be described later, may correspond to a "traveling-prohibited region setting unit".

The traveling-prohibited region Ar or Al is intended to set a region without any road (traveling-prohibited region) opposite to the traveling lane of the own vehicle M across the lane of the crossing road to prevent the own vehicle M from traveling straight across the crossing road by mistaking the accelerator pedal for the brake pedal when turning the own vehicle M right or left.

Figure 9:
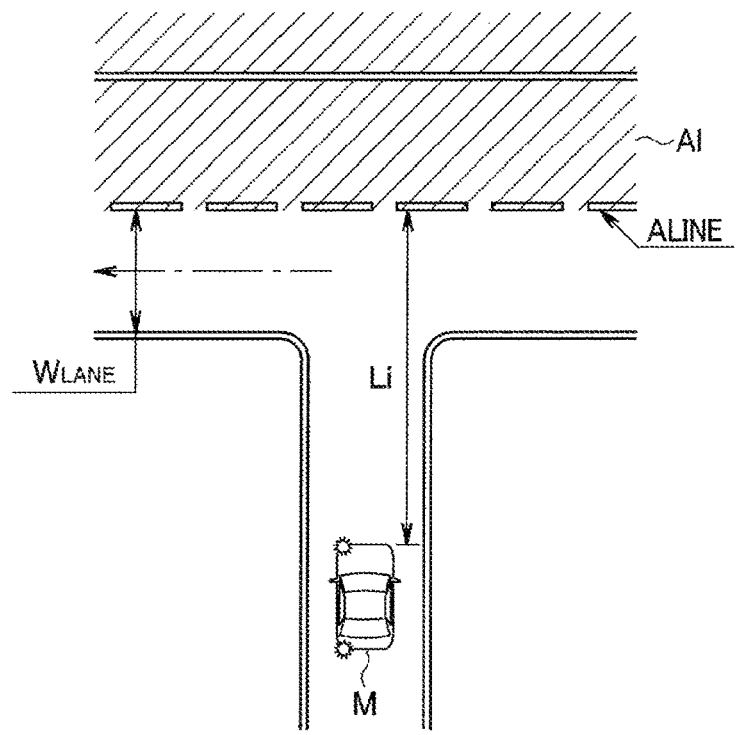
FIG. 9 is an explanatory diagram illustrating acceleration suppression control when a vehicle turns left at a T-junction.

The right-turning traveling-prohibited region Ar and the left-turning traveling-prohibited region Al are set on the road map. That is, as illustrated in FIG. 8, when a lane marker on a road shoulder side of the lane when the own vehicle M turns right to the crossing road is assumed to be a start line ALINE, the right-turning traveling-prohibited region Ar is set on a far-side of the start line ALINE. As illustrated in FIG. 9, when the center of the crossing road is assumed to be the start line ALINE, the left-turning traveling-prohibited region Al is set on the oncoming lane side. As illustrated in FIG. 8 and FIG. 9, the same applies not only to a crossing road having one lane on one side but also to a road having two lanes on one side. Note that "WLANE" in FIG. 8 and FIG. 9 denotes a lane width.

That is, when the own vehicle M tries to turn right or turn left from the lane (traveling lane) in which the own vehicle M is currently traveling to the crossing road, the driver releases the accelerator pedal first, and then steps on the brake pedal to slow down. The driver causes the own vehicle M to turn right or turn left through steering operation while adjusting the vehicle speed, changes the traveling direction to the crossing road, steps on the accelerator pedal and gradually accelerates the vehicle.

Thus, the driver's mistaking the accelerator pedal for the brake pedal is more likely to occur during brake operation before causing the own vehicle to enter the crossing road, and when the driver steps on the accelerator pedal by mistaking the accelerator pedal for the brake pedal, the own vehicle M jumps forward across the crossing road.

Therefore, when the vehicle turns right, the side far from the lane marker on the road shoulder side of the right turning side lane of the crossing road is set as the right-turning traveling-prohibited region Ar, which is a region without any road. When the vehicle turns left, the side far from the lane marker at the center of the crossing road is set as the left-turning traveling-prohibited region Al, which is a region without any road. After that, when the flow proceeds from step S12 to step S14, a reaching distance Li from the own vehicle position to the start line ALINE of the right-turning traveling-prohibited region Ar is calculated and the flow proceeds to step S19. When the flow proceeds from step S13 to step S15, the reaching distance Li from the own vehicle position to the start line ALINE of the left-turning traveling-prohibited region Al is calculated and the flow proceeds to step S19. The reaching distance Li is set based on the position data of the start line ALINE of the right-turning traveling-prohibited region Ar or the start line ALINE of the left-turning traveling-prohibited region Al, which is stored in the road map information, and the position data of the own vehicle M map-mapped on the road map, for example. In one embodiment the processes in steps S14 and S15, and step S17, which will be described later, may correspond to a "reaching distance calculator".

For example, a traffic light is installed at a T-junction and the driver drives the vehicle slowly and the vehicle enters the crossing road when a display of the traffic light on the traveling lane side is green. In that case, since the right-turning position is farther than the left-turning position by a lane width WLANE on a road having one lane on one side as illustrated, for example, in FIG. 8 and FIG. 9, the timing at which the vehicle starts slowing down differs between turning right and turning left. Thus, the reaching distance Li is set using the start lines ALINE of the traveling-prohibited regions Ar and Al as references.

Figure 10:
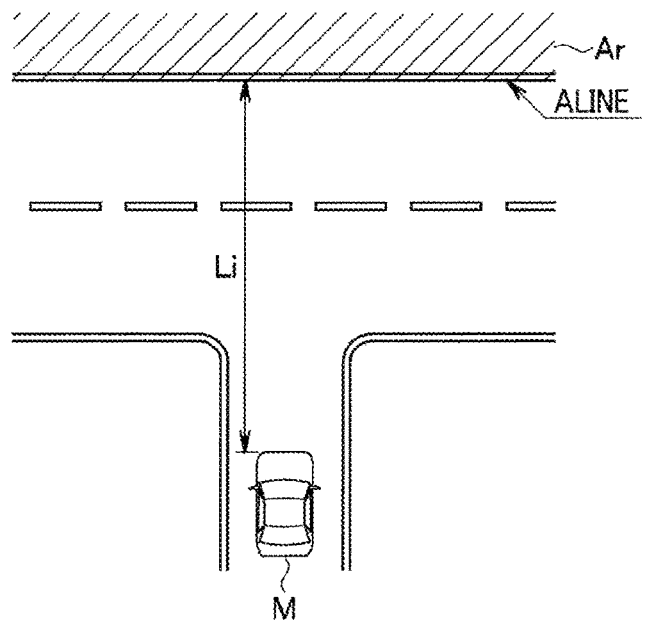
FIG. 10 is an explanatory diagram illustrating acceleration suppression control when it is unknown which direction a vehicle turns at a T-junction.

On the other hand, when the flow proceeds from step S11 to step S16, the right-turning traveling-prohibited region Ar is set and the flow proceeds to step S17 where the reaching distance Li to the start line ALINE of the right-turning traveling-prohibited region Ar is calculated. As illustrated in FIG. 10, for example, when the driver causes the own vehicle M to enter the intersection of the T-junction, even if the turn signal is not ON, the vehicle continues to travel on the crossing road after turning right or turning left. In that case, if the left-turning traveling-prohibited region Al is set, when the driver tries to turn the own vehicle M right, acceleration is suppressed more than necessary, causing uncomfortable feeling to the driver. Thus, when the turn signal is not ON, the reaching distance Li is set using the start line ALINE of the far-side right-turning traveling-prohibited region Ar as a reference.

When the flow proceeds from step S17 to step S18, the reaching distance Li is compared with a predetermined right turn/left turn determination distance Lo. The right turn/left turn determination distance Lo is a timing at which the driver turns ON the turn signal switch 36 to turn right or turn left during normal driving and, for example, is on the order of 20 to 30 meters. If Li>Lo, the routine exits. If Li≤Lo, the flow proceeds to step S19.

Figure 5:
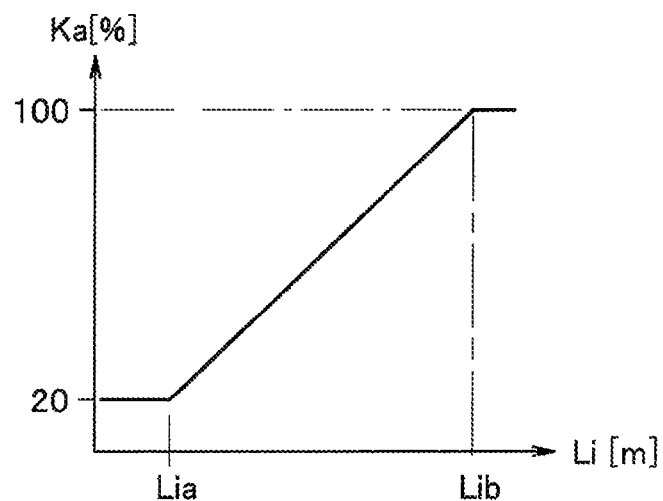
FIG. 5 is a conceptual diagram of an acceleration gain table.

When the flow proceeds from any one of steps S14, S15 and S17 to step S19, the acceleration gain Ka, which is a degree of acceleration suppression is calculated by table retrieval or calculation expression based on the reaching distance Li. FIG. 5 illustrates a concept of an acceleration gain table. As illustrated in FIG. 5, the acceleration gain Ka value is lowered as the reaching distance Li becomes shorter, that is, the acceleration gain Ka is set to a value to increase the degree of acceleration suppression. A near-side limit value Lia is approximately 5 to 10 meters and a far-side limit value Lia is approximately 20 to 30 meters. In one embodiment, the process in step S19 may correspond to an "acceleration suppression degree setting unit".

When the flow proceeds from step S5 or step S19 to step S20, a vehicle speed S [Km/h] detected by the vehicle speed sensor 34 and an accelerator operation amount Pacc [deg] detected by the accelerator opening sensor 32 are read. After that, the flow proceeds to step S21 to compare the accelerator operation amount Pacc with an accelerator operation amount threshold Pac1. The accelerator operation amount threshold Pac1 is a value at which release of the accelerator is detected, and is on the order of Pac1=0 to 5 [deg].

When the accelerator operation amount Pacc exceeds the accelerator operation amount threshold Pac1 (Pacc>Pac1), the flow proceeds to step S22. When the accelerator operation amount Pacc is equal to or falls below the accelerator operation amount threshold Pac1 (Pacc≤Pac1), the flow branches to step S23.

When the flow proceeds to step S22, a basic target acceleration abs is set based on the vehicle speed S and the accelerator operation amount Pacc with reference to a basic target acceleration map (not illustrated). The larger the accelerator operation amount Pacc and the lower the vehicle speed S, the larger value is set as the basic target acceleration abs in the basic target acceleration map. Next, the flow proceeds to step S24, the basic target acceleration $\alpha bs$ is multiplied by the acceleration gain Ka and the target acceleration $\alpha$ is set ($\alpha \leftarrow Ka \cdot \alpha bs$).

The flow proceeds to step S25 where drive torque corresponding to the target acceleration $\alpha$ is calculated, and in step S26, a drive signal corresponding to the drive torque is outputted to the acceleration/deceleration driver 38 and the routine exits. The acceleration/deceleration driver 38 drives the drive source 41 with a drive force corresponding to the drive signal to cause the own vehicle M to travel.

Figure 6:
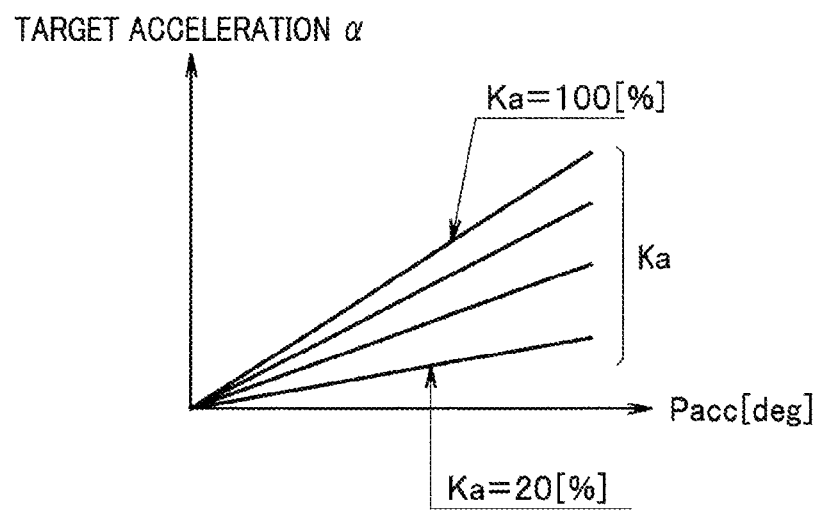
FIG. 6 is a characteristic diagram illustrating a relationship between an accelerator operation amount and target acceleration restricted by an acceleration gain.

As a result, as illustrated in FIG. 6, with respect to the accelerator operation amount Pacc, for example, when the driver steps on the accelerator pedal from a stopped state (vehicle speed=0 [Km/h]), since the acceleration gain Ka is set to a smaller value as the reaching distance Li becomes shorter, the target acceleration $\alpha$ is set to a value of acceleration gradually suppressed more strongly.

Therefore, when the own vehicle M approaches an intersection or enters the main lane from a parking lot, even when the driver steps on the accelerator pedal strongly by mistaking the accelerator pedal for the brake pedal, since the target acceleration $\alpha$ is suppressed, it is possible to prevent abrupt acceleration.

On the other hand, when the flow branches from step S21 to step S23, the value of an acceleration suppression control cancelation flag F is examined. When F=0, it is determined that acceleration suppression control had been in progress until the previous calculation, the flow proceeds to step S27, where the acceleration suppression control cancelation flag F is set (F←1), the acceleration suppression control is canceled and the routine exits. On the other hand, when F=1, it is determined that acceleration suppression control had been canceled until the previous calculation, the flow branches to step S28 where the acceleration suppression control cancelation flag F (F←0) is cleared and resumes the acceleration suppression control is resumed, and the routine exits.

Therefore, when the driver releases the accelerator pedal during the acceleration suppression control, since the acceleration suppression control cancelation flag F is set (F←1) in step S27, the acceleration gain Ka is set to 100 [%] in step S5. As a result, in the case of so-called double stepping, that is, when the driver steps on the accelerator pedal again after releasing the accelerator pedal, it is determined that the driver has consciously stepped on the accelerator pedal and normal target acceleration (corresponding to Ka=100 [%] in FIG. 6) corresponding to the operation amount of the accelerator pedal of the driver is set. In one embodiment, the processes in steps S21, S23 and S27 may correspond to an "acceleration suppression control cancelation detector".

Thus, according to the present embodiment, the forward environment that cannot be recognized by the camera unit 21 is acquired from the road map information, and it is examined whether there is a straight road continuous to the traveling lane of the own vehicle ahead of the crossing road and acceleration suppression control is performed when the straight road does not continue. Therefore, it is possible to recognize in advance, a place where abrupt acceleration needs to be suppressed without using the camera unit 21 (obstacle recognition sensor) and properly suppress abrupt acceleration due to a misstep in the place.

Since the acceleration suppression control is gradually strengthened as the reaching distance Li from the own vehicle M to the start line ALINE of the traveling-prohibited region Ar or Al becomes shorter, the driver is caused to surely recognize the misstep. Furthermore, in the case of double stepping on the accelerator pedal, this is determined as an acceleration request by the driver's intention and the acceleration suppression control is canceled, and it is thereby possible to perform control more in line with the driver's intention.

Note that the technology is not limited to the aforementioned embodiment, but is also applicable to a case where the driving mode of, for example, an automatic driving vehicle is shifted from an automatic driving mode to a manual driving mode in which the driver performs steering operation.

Each of the traveling control unit 31 and the map locator calculator 12 illustrated in FIG. 1 can be implemented by the afore-mentioned microcomputer and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle position estimation calculator 12a and the traveling route setting calculator 12b and the traveling control unit 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the technology, when it is determined that there is a crossing road ahead of the own vehicle, a traveling-prohibited region is set opposite to the own vehicle across the lane of the crossing road, a higher degree of acceleration suppression to suppress acceleration of the own vehicle is set as the reaching distance from the own vehicle to the traveling-prohibited region becomes shorter, and so it is possible to recognize in advance, a place where abrupt acceleration needs to be suppressed without using any obstacle recognition sensor and properly suppress abrupt acceleration due to a misstep in the place.

The invention claimed is:

1. A vehicle driving assist apparatus comprising:
a map information storage configured to store road map information; and
at least one processor configured to function as:
an own vehicle position estimator configured to estimate a current position of an own vehicle traveling on a traveling road;
a crossing road detector configured to map-match the estimated current position of the own vehicle position to the stored road map information and detect a crossing road that intersects the traveling road ahead of the own vehicle;
a traveling-prohibited region setting unit configured to set a traveling-prohibited region i) in an intersection of the crossing road and the traveling road or ii) straight across the intersection from the own vehicle;
a reaching distance calculator configured to calculate a reaching distance from the own vehicle to a start line of the traveling-prohibited region;
an acceleration suppression degree setting unit configured to set a degree of acceleration suppression to suppress acceleration of the own vehicle based on the calculated reaching distance, wherein the degree of acceleration suppression increases as the reaching distance becomes shorter; and
a traveling state controller configured to suppress target acceleration of the own vehicle based on the set degree of acceleration suppression,
wherein, 1) when the crossing road is a left-hand traffic two-way road and when the own vehicle intends to turn left onto the left-hand traffic two-way road or 2) when the crossing road is a right-hand traffic two-way road and when the own vehicle intends to turn right onto the right-hand traffic two-way road, the traveling-prohibited region setting unit sets the traveling-prohibited region in the intersection such that the start line of the traveling-prohibited region is set at a center line of the crossing road, the center line extending across the intersection, and
wherein, 1) when the crossing road is the left-hand traffic two-way road and when the own vehicle intends to turn right onto the left-hand traffic two-way road or 2) when the crossing road is the right-hand traffic two-way road and when the own vehicle intends to turn left onto the right-hand traffic two-way road, the traveling-prohibited region setting unit sets the traveling-prohibited region straight across the intersection from the own vehicle such that the start line of the traveling-prohibited region is set at a road shoulder of the crossing road, the road shoulder being located straight across the intersection from the own vehicle.

2. The vehicle driving assist apparatus according to claim 1, further comprising
a right-turning and left-turning prediction unit configured to predict a direction the own vehicle intends to turn with respect to the crossing road,
wherein the right-turning and left-turning prediction unit predicts the direction the own vehicle intends to turn based on a turn signal switch operation performed by a driver of the own vehicle.

3. The vehicle driving assist apparatus according to claim 2, wherein, when the turn signal switch is not operated and when the traveling road, on which the own vehicle travels, extends across the crossing road, the traveling-prohibited region setting unit does not set the traveling-prohibited region.

4. The vehicle driving assist apparatus according to claim 3, wherein
the own vehicle is an automatic driving vehicle,
when a driving mode of the automatic driving vehicle is shifted from an automatic driving mode to a manual driving mode in which the driver performs steering operation, the acceleration suppression degree setting unit sets the degree of acceleration suppression, and the traveling state controller suppresses acceleration of the own vehicle based on the set degree of acceleration suppression.

5. The vehicle driving assist apparatus according to claim 2, wherein, when the turn signal switch is not operated and when the traveling road does not, on which the own vehicle travels, extends across the crossing road, the traveling-prohibited region setting unit sets the start line of the traveling-prohibited region on the road shoulder of the crossing road.

6. The vehicle driving assist apparatus according to claim 5, wherein
the own vehicle is an automatic driving vehicle,
when a driving mode of the automatic driving vehicle is shifted from an automatic driving mode to a manual driving mode in which the driver performs steering operation, the acceleration suppression degree setting unit sets the degree of acceleration suppression, and
the traveling state controller suppresses acceleration of the own vehicle based on the set degree of acceleration suppression.

7. The vehicle driving assist apparatus according to claim 2, wherein
the own vehicle is an automatic driving vehicle,
when a driving mode of the automatic driving vehicle is shifted from an automatic driving mode to a manual driving mode in which the driver performs steering operation, the acceleration suppression degree setting unit sets the degree of acceleration suppression, and
the traveling state controller suppresses acceleration of the own vehicle based on the set degree of acceleration suppression.

8. The vehicle driving assist apparatus according to claim 1, wherein
the own vehicle is an automatic driving vehicle,
when a driving mode of the automatic driving vehicle is shifted from an automatic driving mode to a manual driving mode in which a driver performs steering operation, the acceleration suppression degree setting unit sets the degree of acceleration suppression, and
the traveling state controller suppresses acceleration of the own vehicle based on the set degree of acceleration suppression.

9. The vehicle driving assist apparatus according to claim 1, further comprising:
an accelerator operation amount detector configured to detect an operation amount of an accelerator pedal; and
an acceleration suppression control cancelation detector configured to detect release of the accelerator pedal based on the detected operation amount of the accelerator pedal,
wherein, when the acceleration suppression control cancelation detector detects the release of the accelerator pedal, the traveling state controller cancels acceleration suppression on the target acceleration.

10. A vehicle driving assist apparatus comprising:
a map information storage configured to store road map information; and
circuitry being configured to:
estimate a current position of an own vehicle traveling on a traveling road;
map-match the estimated current position of the own vehicle to the stored road map information;
detect a crossing road that intersects the traveling road ahead of the own vehicle;
set a traveling-prohibited region i) in an intersection of the crossing road and the traveling road or ii) straight across the intersection from the own vehicle;
calculate a reaching distance from the own vehicle to a start line of the traveling-prohibited region;
set a degree of acceleration suppression to suppress acceleration of the own vehicle based on the calculated reaching distance, wherein the degree of acceleration suppression increases as the reaching distance becomes shorter; and
suppress target acceleration of the own vehicle based on the set degree of acceleration suppression,
wherein, 1) when the crossing road is a left-hand traffic two-way road and when the own vehicle intends to turn left onto the left-hand traffic two-way road or 2) when the crossing road is a right-hand traffic two-way road and when the own vehicle intends to turn right onto the right-hand traffic two-way road, the circuitry sets the traveling-prohibited region in the intersection such that the start line of the traveling-prohibited region is set at a center line of the crossing road, the center line extending across the intersection, and
wherein, 1) when the crossing road is the left-hand traffic two-way road and when the own vehicle intends to turn right onto the left-hand traffic two-way road or 2) when the crossing road is the right-hand traffic two-way road and when the own vehicle intends to turn left onto the right-hand traffic two-way road, the circuitry sets the traveling-prohibited region straight across the intersection from the own vehicle such that the start line of the traveling-prohibited region is set at a road shoulder of the crossing road, the road shoulder being located straight across the intersection from the own vehicle.

* * * * *